D. H. SCOTT.
ICE TRACTOR.
APPLICATION FILED MAR. 28, 1917.
1,343,687.
Patented June 15, 1920.
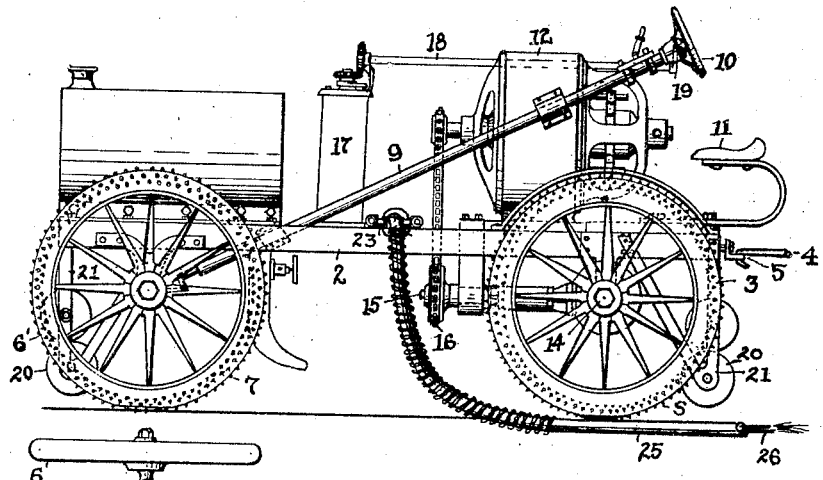
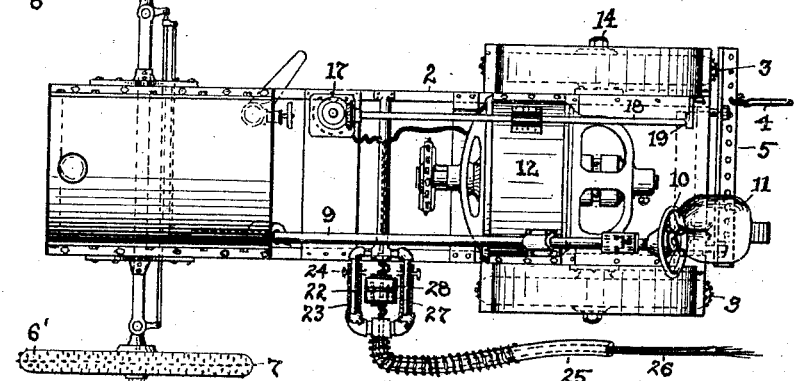
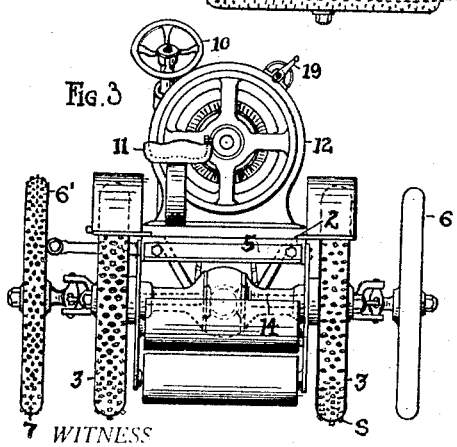
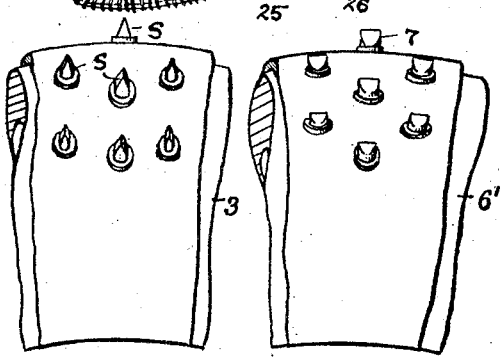
WITNESS
Geo. E. Kricker.
INVENTOR.
DUDLEY H. SCOTT
BY Fisher & Moser
ATTORNEYS.

UNITED STATES PATENT OFFICE.

DUDLEY H. SCOTT, OF CLEVELAND, OHIO.

ICE-TRACTOR.

1,343,687.  Specification of Letters Patent.  Patented June 15, 1920.

Application filed March 28, 1917. Serial No. 157,875.

*To all whom it may concern:*

Be it known that I, DUDLEY H. SCOTT, citizen of the United States, residing at Cleveland, in the county of Cuyahoga and State of Ohio, have invented certain new and useful Improvements in Ice-Tractors, of which the following is a specification.

This invention relates to an ice tractor designed especially for use in ice skating rinks to draw an ice planing machine in a circuitous path at high working speed without skidding over the ice surface and without marring the planed ice surface. To understand the conditions which must be met I wish to state briefly that the ice planer which I employ has a long cutting blade capable of planing a swath forty-two or more inches wide to a depth of one-sixteenth of an inch or more, and considerable power and traction is required to pull this planer in a circuit and to cut the ice at a speed of ten miles an hour. The use of an internal combustion engine for power purposes is objectionable on account of the offensive exhaust fumes which would be discharged into the closed building, and the heavy power demands make the use of electric storage batteries impracticable. Therefore, I have designed a tractor embodying a powerful electric motor which is adapted to receive its current from service lines and through a trailing electrical conductor substantially as shown and described in my application for Letters Patent filed March 24, 1917, Ser. No. 157,239, and to assure efficient traction without injury to the ice surface, I employ pneumatic tires adapted to give a flat bearing tractor surface and which tires have studded treads especially designed to enter and grip the ice for the best driving and steering effects without noticeably injuring the ice surface. The driving and steering wheels are also particularly related and constructed to afford stability to the tractor in turning and to avoid travel of the studded treads over the planed ice surfaces, all as hereinafter more particularly described.

In the accompanying drawings, Figure 1 is a side elevation of the tractor, while Fig. 2 is a plan view, and Fig. 3 is a rear elevation thereof. Fig. 4 is an enlarged view of a section of one side of the driving wheel tire, and Fig. 5 is a similar view of the steering wheel tire.

The tractor has a short wheel base, a relatively wide spread of the wheels at the front, and a narrow wheel gage at the rear, to give a short turning radius, and comprises a chassis frame 2 suitably mounted on front and rear axles of different lengths, the rear axle being shortened to bring at least one of the drive wheels 3 thereon within the swath or cutting width of the knife of the planing machine which is connected by a draw bar 4 to the perforated angle iron 5 affixed at the rear end of frame 2. The draw bar connection is usually made at one side of the longitudinal median degree relatively to the tractor, thus permitting the knife to remove any indentations or scores made in the ice by the spurs or studs S on the drive wheel tire 3 directly in front of the planer at the right hand side of the tractor. The front or steering wheels 6 of the tractor have a wider base, that is, are farther apart than the rear drive wheels, and the tread or tire of the steering wheel 6 at the right-hand side of the tractor is without metal studs to avoid marring that portion of the ice surface over which it rides. In this way the swath which has been planed during the preceding trip of the tractor and planer in its circuit around the rink is not cut up by the tractor wheels, it being understood that the tractor and planer travel in a circuit spirally over the ice surface to produce an overlapping cut with the right hand steering wheel nearly always riding on the planed ice surface. The two rear wheels are only about-one-half as far apart as the two front wheels, which considerably narrows the gage of track covered by the driving wheels, and the relative wider wheel spread at the front furnishes the needed stability to prevent the machine from turning over in making the turns. On the other hand the right hand wheel 6 which rides on the smooth planed ice has a plain smooth tread, which unavoidably throws the major work of steering the tractor on the left hand wheel 6', and the work which this single wheel 6' has to do is further augmented by the one-sided pull brought to bear on the tractor through the off-center draw-bar connection for the planer. To meet this condition, I use sharp flat-faced tire studs or V-shaped projections 7 made of metal on the periphery of the pneumatic tire for wheel 6' and set these studs with the plane of their flat faces parallel with the plane of the wheel to better resist a side skidding movement at the front end of the tractor and to aid in turning the tractor on the ice, see Fig. 5. The rear wheel tires have similar flat-faced studs S but these studs are placed with the plane of their flat sides extending transversely to the direction of movement of the tractor to better drive the tractor forward. If desired, the flat sides of the studs may be arranged both lengthwise and transversely on the same tire for effective driving and steering purposes, and the mechanism for steering may be of the conventional type controlled by a steering shaft 9 having a hand wheel 10 located above the operator's seat 11.

The tractor is preferably driven by a powerful electric motor 12 mounted upon frame 2 between the rear drive wheels where the weight is best distributed for traction effects, and power is communicated to the differential driving gear of axle 14 of the rear wheels by a countershaft 15 having a sprocket wheel 16 in chain driving connection with a sprocket gear on the motor shaft. A suitable switch or speed controller 17 for the motor is also provided, and any suitable mechanism may be used to operate this controller. As shown, a rotatable shaft 18 is geared to the controller shaft and provided with a crank handle 19 at its rear end within convenient reach of the driver occupying seat 11.

The depth to which the V-shaped studs may be caused to enter the ice may be regulated by the weight of the tractor and any load carried thereby, and to this end I find it advantageous to employ additional weights consisting of solid cast-iron cylinders 20 removably hung upon brackets 21 projecting downward from frame 2, and it is desirable to place these weights at the front as well as at the rear of the tractor to properly steer the tractor, which it must be remembered, rides on smooth ice.

The electrical conductor for the electric motor is detachably connected with the tractor in a particular way to permit the conductor to trail within a protecting conduit behind and at one side of the tractor. Thus, a rigid forked member 22 is projected at one side of frame 2 to place the conductor clear and free of the rear wheel, and a tubular coupling member 23 telescopes over the branches of said supporting member 22 and is detachably held thereon by pins 24 or other suitable fastening means. The flexible conduit 25 is attached to coupling member 23 and the conducting wires 26 pass through this conduit to one section 27 of a separable electrical connector. The other section 28 of this connector is electrically connected to the motor and its switch or controller 17.

What I claim is:

1. An ice tractor having pivoted steering wheels at its front, only one of said wheels being provided with a metal-studded tread in combination with a pair of studded drive wheels at the rear of said tractor.

2. An ice tractor having one steering wheel provided with a tread to ride over the ice without marking the surface and a second steering wheel provided with traction elements constructed to enter the ice and resist side movement of the wheel in combination with a pair of studded drive wheels offset laterally to said steering wheels.

3. An ice tractor having rear drive wheels and a front steering wheel all provided with traction projections to enter the ice, and a member of heavy weight at both the rear and front ends of said tractor to press said projections into the ice to facilitate both driving and steering of the tractor and a front stabilizing and steering wheel laterally beyond the rear drive wheels.

4. An ice tractor having a main frame and a set of drive wheels at the rear thereof provided with metal studded tires, an electric motor mounted upon said frame between said wheels, a set of steering wheels at the front of said frame, and one of said steering wheels having a tread formed to ride over the ice without marking the surface and located to travel laterally beyond the line of travel of the drive wheel at the rear thereof and the other of said steering wheels having a metal studded tread to engage the ice and to hold the tractor to a given course.

5. An ice tractor having a main frame and driving wheels thereon provided with sharp studs, and a set of front steering wheels set outwardly at each side beyond the line of travel of the rear wheels and only one of said front wheels having metal studs to engage the ice and prevent slipping.

6. An ice tractor having a main frame and rear drive wheels and front steering wheels having a wider wheel base than said rear wheels to permit their travel outside of the line of travel of the rear wheels, one of the said front wheels having a smooth tread and the other a metal-studded tread to engage the ice.

7. An ice tractor having steering and driving wheels provided with pneumatic tires having sharp flat metal studs with straight edges extending transversely and longitudinally.

8. An ice tractor having rear wheels provided with resilient tires having sharp flat-faced studs placed transversely of the wheel tread, and front steering wheels provided with resilient tires having sharp flat-faced studs placed longitudinally of the wheel treads.

Signed at Cleveland, in the county of Cuyahoga and State of Ohio, this 23rd day of March, 1917.

DUDLEY H. SCOTT.